United States Patent [19]
Reade et al.

[11] 3,840,384
[45] Oct. 8, 1974

[54] METHOD AND DEVICE FOR COATING PLASTICS FILM

[75] Inventors: Grahame Melvin Reade, Wheathampstead; Alan Charles Viney, Welwyn Garden City, both of England

[73] Assignee: Imperial Chemical Industries Limited, London, England

[22] Filed: Mar. 3, 1972

[21] Appl. No.: 231,523

[30] Foreign Application Priority Data
Mar. 19, 1971  Great Britain.................... 7296/71

[52] U.S. Cl. ............. 117/8, 117/111 R, 117/111 F, 117/113, 156/180, 118/405, 118/DIG. 11
[51] Int. Cl. ............................................. B05c 3/12
[58] Field of Search ............ 117/111 R, 111 F, 113, 117/8; 118/404, 405, DIG. 11; 156/180

[56] References Cited
UNITED STATES PATENTS

| 2,007,578 | 7/1935 | Madge et al. ................... 117/111 R |
| 2,694,661 | 11/1954 | Meyer................................. 156/180 |
| 3,170,968 | 2/1965 | Rokunohe et al. ..................... 117/8 |
| 3,350,248 | 10/1967 | Demarest............................ 118/405 |
| 3,544,669 | 12/1970 | Schock .............................. 117/148 |
| 3,574,665 | 4/1971 | Basche................................ 118/405 |
| 3,685,206 | 8/1972 | Kessler............................... 156/279 |

Primary Examiner—Michael Sofocleous
Attorney, Agent, or Firm—Cushman, Darby & Cushman

[57] ABSTRACT

A method and device for coating plastic films in which the thickness of the coating is controlled by passing the coated film under steady pressure past a resilient scraping member in whose surface are embedded solid particles which space the film from the surface of the resilient member.

15 Claims, 1 Drawing Figure

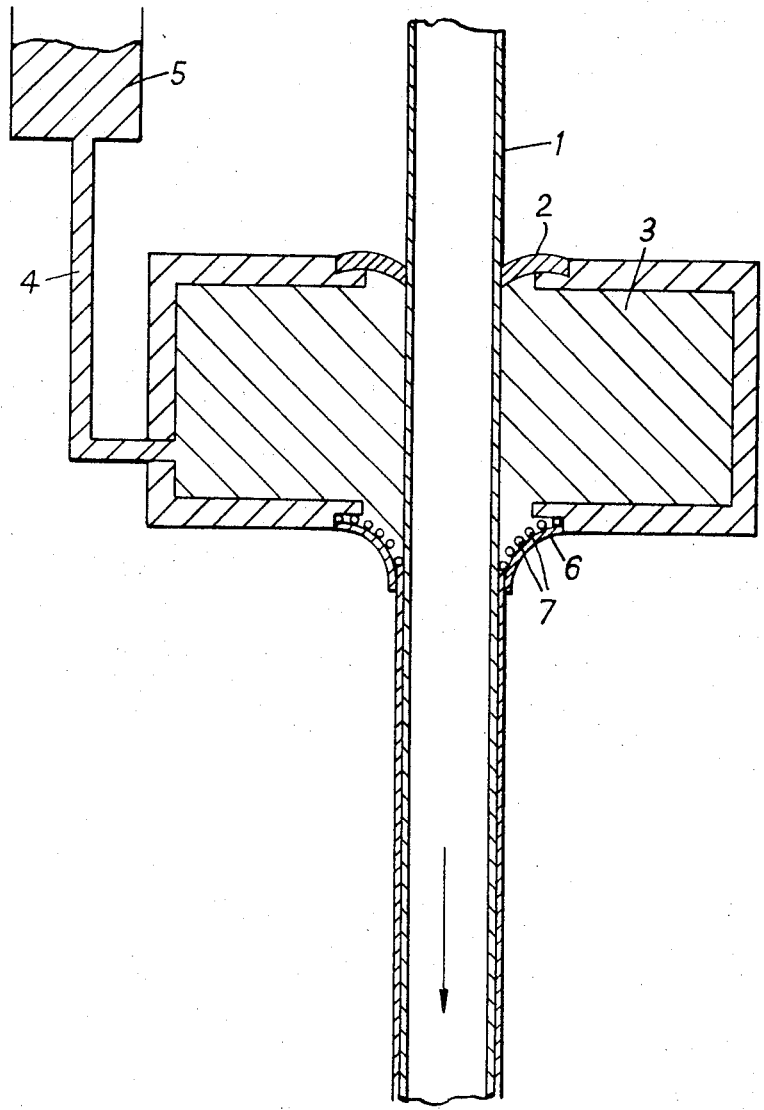

METHOD AND DEVICE FOR COATING PLASTICS FILM

This invention relates to a method and device for coating plastic films.

It is known to coat plastic film surfaces by applying a coating in a flowable condition to the surface to be coated, and regulating the thickness of the coating by removing excess, by a doctor knife or other scraping device, by the use of an air knife, or by other means.

Scraping devices formed of resilient materials have been used in such methods, the device contacting the film under a pressure adjusted to give a coating of the required thickness. We have found, however, that when a very thin coating layer is required, it is difficult to adjust the pressure exerted by such a device to give a layer of the required thickness, without removing the coating material altogether, at least over parts of the film surface.

The present invention provides a method and device by which very thin coatings of flowable materials may be applied to plastic film surfaces.

In accordance with the present invention, a method of coating a plastic film with a flowable material comprises applying the flowable material to the film surface and regulating the thickness of the applied material by passing the film with the coating material thereon past a resilient scraping member a surface of which is biassed towards the film surface under a substantially constant pressure, the said surface of the scraping member having a particulate material embedded therein and evenly distributed so as to provide a fine clearance between said surface and the surface of the plastic film.

The invention further provides a device for coating a surface of a plastic film comprising a resilient scraping member, means for drawing a plastic film past the scraping member and in contact therewith under a substantially constant pressure, and means for applying a flowable coating material to the film surface in advance of the scraping member, the resilient scraping member having a particulate material evenly distributed upon and embedded in its film-contacting surface.

The method of the invention may be used to coat flat or tubular film of plastic material, and may be used to apply a simple coating, or an anchor coating, or a subsequent coating to the film. It is especially useful for applying anchor coatings, since these may generally be very thin coatings applied to a substrate for the purpose of improving the adhesion between that substrate and a subsequently applied coating. The invention is particularly useful when applied to the coating of tubular film, by a method in which a tubular film of substantially cylindrical configuration is treated by being passed through an annular scraping member of appropriate perimeter. In a preferred form of this method, the scraping member forms a seal in a vessel containing the coating material, and the tubular film passes through the vessel upwards or downwards, and through the seal, which allows a layer of the coating material, which may be a very thin layer, to remain over the entire surface of the tubular film. When this method is used for coating a tubular film passing downwards, it is preferred to maintain a steady pressure of the liquid in the vessel, for example by feeding it from a constant head source. The head of liquid will affect the thickness of the coating, and thus may be adjusted to give a desired thickness over a certain range for a particular construction and setting of the scraping member. The method of the invention is particularly useful for coating tubular film received directly from the extrusion die, or after it has been sized to a desired diameter by an internal mandrel. The method is also applicable to the coating of tubular film which has been expanded by means of internal gas pressure.

One preferred form of the method and device of the invention will now be described by way of example with reference to the accompanying drawing, which is a diagrammatic section of a device for coating a plastic tubing or tubular film with a latex, shown in operation.

In this drawing, 1 is the tubing, which is passed downwards in a substantially cylindrical state through a seal, 2, suitably of silicone rubber, into a closed applicator vessel, 3, filled with the latex for coating. The latex is supplied to the applicator 3, through pipe 4, from a reservoir, 5, in which a constant level of the latex is maintained. An outlet valve (not shown) to applicator 3 is opened during the initial filling of the applicator, and is closed when it has been completely filled. During filling, the applicator vessel is vented to atmosphere by a valve (not shown) to enable the vessel to be completely filled, thereby expelling from the vessel air which might otherwise tend to coagulate the latex in the vessel. The tube 1 passes downwards through the latex and through the seal 6, which acts as the scraper member of the device, which again is suitably of silicone rubber, and which has particles, 7, suitably of carborundum powder, embedded in its inner surface. These particles are evenly distributed upon the surface and are of uniform size. The tubing emerges from the seal 7 with a thin uniform coating, 8, of the latex upon its surface; it may then be passed to a dryer or to any further processing, such as, for example, to a biaxial stretching operation, for which it is heated to a temperature that will be sufficiently high to dry the latex. The thickness of the latex coating may be adjusted by varying the level of the latex in the reservoir 5, and thus the pressure in the applicator vessel 3.

Many modifications may be made in the device and method particularly described. For example, other methods may be used for applying the coating material to the film surface in advance of the scraping member, but it is generally preferred to use a method that provides a constant pressure of the material against the scraper member. The device may of course be adapted to coat flat films, on one surface or simultaneously on both surfaces.

The coating method may be used for coating plastic films, whether flat or tubular, before or after they are oriented by stretching if this is required. If the film is to be oriented, the coating is preferably applied first, since orientation generally produces a marked improvement in adhesion of the coating to the film.

Any resilient material, rubber or plastics, may be used to form the resilient seal or other resilient scraping member used in accordance with the invention; silicone rubber, however, is particularly suitable. The particulate substance may be embedded in the surface of the resilient material by any appropriate method. For silicone rubber, or other material shaped from a latex, the particles are preferably distributed on and pressed into the surface before the material is cured to its resilient form. The particulate substance is preferably a hard substance, so that the particles do not rapidly become worn away. Particularly useful materials are those that are abrasive in normal use; they include carborundum powder, chopped fibre glass, metal particles, ceramic particles. Carborundum powder is particularly preferred, since it has the required physical characteristics and is readily available in graduated sizes. The particle size is selected so that the particles, when embedded in the scraping member, will give the desired fine clearance between the scraping member and the film. An important function of the particulate material is to provide uniformity of the coating layer over the width or periphery of the film surface. The size of the particles does affect the thickness of the coating, as does the viscosity of the coating material, but a more significant effect on thickness is that of the pressure of coating material behind the scraping member.

The method of the invention may be used for providing a coating from any flowable material upon the plastic film surface. It is most useful for applying coatings from mobile latices or solutions, since these may be used to apply particularly thin coatings. For example, the method is particularly useful for applying, as latices, thin coatings of vinylidene chloride copolymers of the type used for anchor coatings or for heat-sealable top coatings. The latex is dried after its application, and this should be accomplished before the film is reeled, and, in the case of tubular film, before the film is collapsed to the lay-flat form. Air drying or other drying methods may be applied, but drying of thin coatings may often be allowed to take place during a convenient stage in the further processing of the film, particularly one in which the film is heated. For example, if a thinly coated film is subsequently to be heat-treated, for example to orient or heat set the film, the drying of the latex may generally be accomplished without any special measures being taken. Orienting and heat setting methods, including those for producing monoaxial or biaxial orientation in films of flat or tubular form, are, of course, well known in the art.

Plastic films that may be coated by the method of the present invention include those formed, for example, of linear polyesters such as polyethylene terephthalate, or polyolefines such as polyethylene, polypropylene and copolymers of ethylene or propylene with other olefines or other comonomers, or of polycarbonate resins.

Our invention is illustrated but in no way limited by the following Example, parts being given by weight.

EXAMPLE

The device shown in the drawing was used to deposit a thin coating of polyvinylidene chloride copolymer upon amorphous tubing of polyethylene terephthalate which was subsequently to be biaxially stretched to provide oriented tubular film.

The tubing, which had a diameter of 0.437 inches (10.7 mm), was passed through the device at 30 ft/min (9.1 m/min). A latex of polyvinylidene chloride/acrylonitrile copolymer, (93:7) containing 45 percent solids, was fed into the applicator from a reservoir with a head of 5 inches (127 mm) water gauge. The lower seal of the applicator was of silicone rubber, one-sixteenth inch (1.587 mm) thick with particles of carborundum powder, of size 140 microns, embedded in its inner surface. A thin coating of latex, 0.0001 inch (0.00254 mm) thick when wet, was deposited upon the moving tubing. This was dried at a temperature of 100°C. The dried coating was uniformly formed over the whole surface of the tubing.

We claim:

1. A method of coating the entire surface of a plastic film with a flowable polymeric coating material comprising applying the flowable polymeric coating material to the film surface, regulating the thickness of the applied polymeric coating material to provide a uniform coating layer on the film surface by passing the film with the polymeric coating material thereon past a resilient scraping member a surface of which is biased towards the film surface under a substantially constant pressure, the said surface of the scraping member having a particulate material embedded therein and evenly distributed so as to provide a fine clearance between said surface and the surface of the plastic film, and thereafter drying the applied polymeric coating material.

2. A method according to claim 1 wherein the plastic film is tubular, and including passing a tubular plastic film of substantially cylindrical configuration through an annular scraping member of appropriate perimeter.

3. A method according to claim 2 further comprising passing the tubular plastic film through a vessel containing the polymeric coating material and through an annular scraping member which forms a seal in the vessel.

4. A method according to claim 3 further comprising maintaining a steady pressure of polymeric coating material in the vessel.

5. A method according to claim 1 in which the polymeric coating material is a latex or solution.

6. A method according to claim 1 in which the coated film is heated to dry the coating.

7. A method according to claim 1 in which the coated film is subsequently oriented by stretching.

8. A device for coating a surface of a plastic film comprising a resilient scraping member, means for drawing a plastic film past the scraping member and in contact therewith under a substantially constant pressure, and means for applying a flowable polymeric coating material to the film surface in advance of the scraping member, the resilient scraping member having a particulate material evenly distributed upon and embedded in its film-contacting surface.

9. A device according to claim 8 wherein the plastic film to be coated is tubular and wherein the scraping member is annularly configured to receive the coated tubular film and pass the film therethrough.

10. A device according to claim 9 in which the annular member forms a seal in a vessel for containing coating material.

11. A device according to claim 10 comprising further means for maintaining a steady pressure of coating material in the vessel.

12. A device according to claim 8 in which the scraping member is formed from silicone rubber.

13. A device according to claim 8 in which the particulate material is an abrasive material.

14. A device according to claim 13 in which the abrasive material is carborundum powder.

15. A device according to claim 8 in which the average particle size of the particulate material is 140 microns.

* * * * *